United States Patent [19]

Ward

[11] Patent Number: 4,572,723
[45] Date of Patent: Feb. 25, 1986

[54] NITROGEN GENERATOR PROCESS FOR THE PRODUCTION OF LOW VOLUMES OF HIGH PURITY NITROGEN FROM COMPRESSED AIR

[75] Inventor: Derek E. Ward, Barnet, United Kingdom

[73] Assignee: Bergwerksverband GmbH, Essen, Fed. Rep. of Germany

[21] Appl. No.: 633,185

[22] Filed: Jul. 23, 1984

[30] Foreign Application Priority Data

Jul. 23, 1983 [GB] United Kingdom ............... 8319880

[51] Int. Cl.$^4$ ............................................. B01D 53/04
[52] U.S. Cl. .......................................... 55/25; 55/68; 55/75
[58] Field of Search .................................. 55/75, 25, 68

[56] References Cited

U.S. PATENT DOCUMENTS

4,415,340 11/1983 Knoblauch et al. ................. 55/75

FOREIGN PATENT DOCUMENTS

1480866 7/1977 United Kingdom .
1541767 3/1979 United Kingdom .

*Primary Examiner*—John Doll
*Assistant Examiner*—Wayne A. Langel
*Attorney, Agent, or Firm*—Karl F. Ross; Herbert Dubno

[57] ABSTRACT

A process for the production of small quantities of nitrogen from a supply of compressed air. The process uses a carbon molecular sieve to preferentially remove oxygen so that a nitrogen stream containing less than 10 vpm of oxygen can be provided.

5 Claims, 1 Drawing Figure

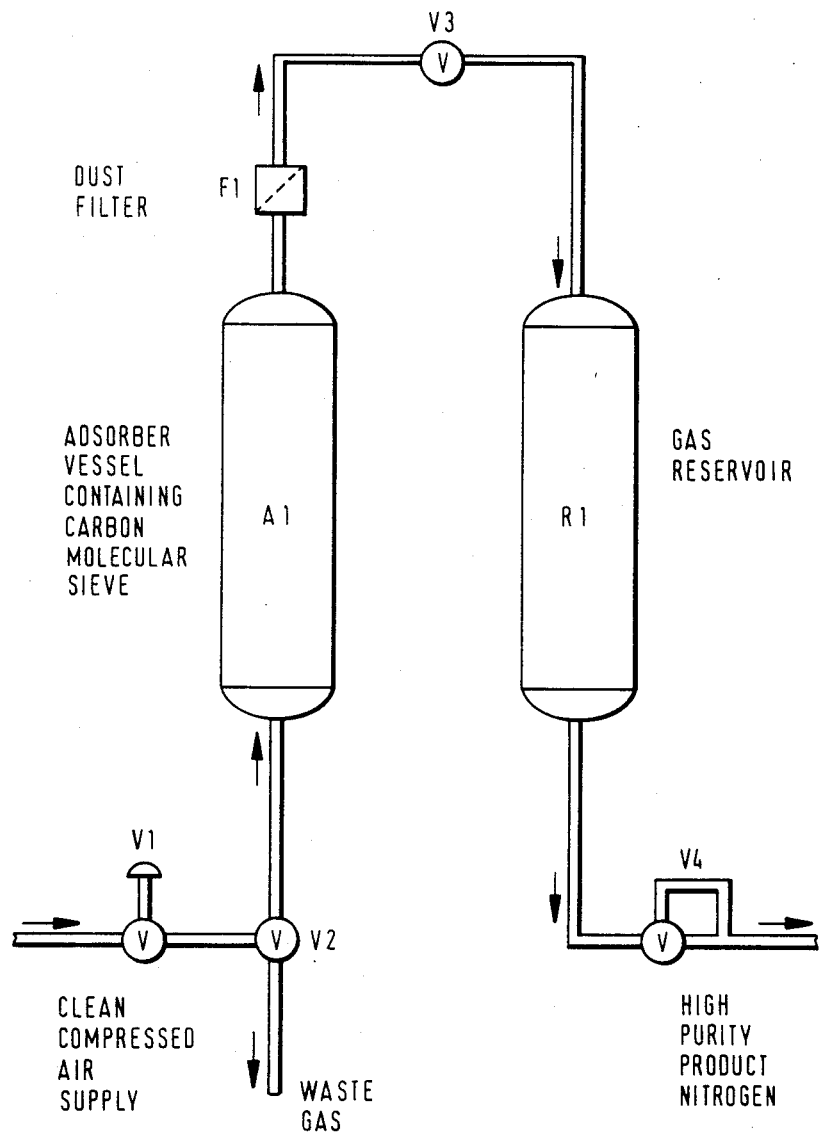

NITROGEN GENERATOR PROCESS FOR THE PRODUCTION OF LOW VOLUMES OF HIGH PURITY NITROGEN FROM COMPRESSED AIR

FIELD OF THE INVENTION

The invention relates to a process for producing a nitrogen-rich gas from a mixture containing oxygen and nitrogen, for example air, by means of molecular sieve coke. Nitrogen in this form is used in many applications in industry where a limited presence of oxygen is necessary.

BACKGROUND OF THE INVENTION

A particular example of the use of such nitrogen gases is the conventional use of nitrogen containing 10 v.p.m. of oxygen in gas chromatography. In gas chromatograpy the nitrogen is a carrier gas and oxygen if present can react detrimentally with the adsorbent materials used in the separation column. The quantities of nitrogen required are usually about 100 c.c./min. and this is usually provided by a cylinder of high purity nitrogen made by the conventional cryogenic process. The purpose of this invention is to provide a low cost alternative to cylinder high purity nitrogen by the production of nitrogen from a source of compressed air. A suitable adsorbant material for the separation of nitrogen from air is produced by Bergwerksverband GmBH, of Frillendorferstrasse 351, Essen, West Germany. The material is an activated coke in which the pore sizes have been modified so that a separation of oxygen and nitrogen can be made since the oxygen molecule is slightly smaller than the nitrogen molecule. The method of production of this special activated coke known as a carbon molecular sieve is documented in several U.K. patents as is the Bergwerksverband process enabling nitrogen to be produced. A particularly relevant Bergwerksverband patent is GB No. 1541767.

In this patent the use of two adsorbent columns is described and oxygen levels in the produced nitrogen are in the range of 0.1 to 3% oxygen.

OBJECT OF THE INVENTION

It is the object of the present invention to provide an improved process for the production of such nitrogen-rich gas having a low oxygen content.

SUMMARY OF THE INVENTION

In this invention a single adsorbent column is used, the rate of ingress of compressed air is critical and the on-stream adsorber time can be in the range 40 to 1000 secs., but typically 500 secs. whereas the Bergwerksverband process uses cycle times of 30-90 secs. and two adsorbent towers.

BRIEF DESCRIPTION OF THE DRAWING

The above and other ojbects, features and advantages of the present invention would become more readily apparent from the following description, reference being made to the accompanying drawing in which the sole FIGURE is a diagram of an apparatus for carrying out the method of the present invention

SPECIFIC DESCRIPTION

The FIGURE of the drawing shows process flow diagram in which compressed air at a pressure in the range 4-15 Bar is supplied either from an existing source or a special compressor. The air must be free of oil and water droplets and this can be ensured by the use of special proprietary filters and separator systems so a dry or oil lubricated air compressor can be used. The compressed air flows at a controlled rate through V1 and via the three way valve V2 into the adsorber vessel A1. The pressure in the adsorber vessel containing the carbon molecular sieve is allowed to rise very slowly over a period typically of about 500 secs. and when the pressure reaches the pressure of the reservoir R1, a small quantity of high purity nitrogen gas will pass through the filter F1 via the non-return valve V3 into the reservoir R1 towards the end of the cycle time.

Typically the air will be at a pressure of 7 Bar G, and the production nitrogen will be available at a pressure of about 6 Bar G and its delivering pressure for use controlled by the pressure reducing valve V4.

After the 500 secs. pressure raising and production time the value V2 is sent a signal altering the flow direction so that the supply of compressed air to the vessel A1 is cut-off and the gas in the vessel A1, essentially a mixture of oxygen and nitrogen, is vented to atmosphere for a similar period such as 500 secs. The process is then repeated so that every 500 secs. the vessel A1 is alternately pressurised and vented in sequence. In order to give continuity of nitrogen gas supply, the reservoir R1 is sized so that its pressure does not fall below the minimum required for a given usage pattern.

For example if the adsorber vessel A1 contains 16 liters of the previously identified standard carbon molecular sieve from Bergwerksverband for the $O_2/N_2$ separation, and is supplied with compressed air at 7 Bar G at a carefully controlled rate, the production rate is 300 c.c.s./min. of nitrogen containing 10 volumes per million (vpm) of oxygen.

The adsorber cycle time being 520 secs. on stream and 520 secs. off stream. The same adsorber, under the same conditions can produce 700 c.c./min. of nitrogen containing not more than 100 v.p.m. of oxygen or 3000 c.c./min. containing not more than 500 v.p.m. of oxygen.

The main area of application of the invention is the low capital cost replacement of high purity nitrogen (less than 10 v.p.m.) conventionally supplied by cylinders. Other applications are anticipated for different purities but the main case will be in gas chromotography and similar applications.

What I claim is:

1. A method of producing a low-oxygen, nitrogen-rich product gas, comprising the steps of:
   (a) passing compressed air for a period of about 500 seconds through an adsorber vessel containing a carbon molecular sieve and discharging said product gas therefrom only during a latter part of said period upon the buildup of pressure in said adsorber to a given back pressure, during a first part of an adsorber cycle;
   (b) venting said adsorber to the atmosphere during the remainder of said adsorber cycle; and
   (c) cyclically repeating steps (a) and (b) alternately in successive adsorber cycles while storing the product gas produced in said cylces at said back pressure to enable continuous draw of product gas from the product gas thus stored.

2. The method defined in claim 1 wherein said compressed air is supplied to said adsorber at a gauge pressure of about 7 bar for a period of about 500 seconds during step (a) of each cycle.

3. The method defined in claim 2 wherein step (b) includes evacuating said adsorber to the atmosphere.

4. The method defined in claim 3 wherein only a single adsorber is used.

5. The method defined in claim 3 wherein a plurality of adsorbers are connected in parallel and simultaneously undergo steps (a) and (b) of each cycle.

* * * * *